United States Patent
Wehrend et al.

(10) Patent No.: US 6,614,782 B1
(45) Date of Patent: Sep. 2, 2003

(54) COMMUNICATIONS SYSTEM TO TRANSMITTING DATA PACKETS BETWEEN AFFILIATED COMMUNICATION TERMINALS AND/OR COMMUNICATION TERMINALS OF AFFILIATED LOCAL NETWORKS

(75) Inventors: Klaus Wehrend, Eichenau (DE); Gerhard Benning, Unterschleissheim (DE); Josef Fellerer, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/381,415

(22) PCT Filed: Mar. 11, 1998

(86) PCT No.: PCT/DE98/00717

§ 371 (c)(1),
(2), (4) Date: Sep. 20, 1999

(87) PCT Pub. No.: WO98/43461

PCT Pub. Date: Jan. 10, 1998

(30) Foreign Application Priority Data

Mar. 20, 1997  (DE) .......................................... 197 11 720

(51) Int. Cl.⁷ .............................................. H04L 12/66
(52) U.S. Cl. ..................... 370/352; 370/465; 370/466; 370/467; 370/353
(58) Field of Search ................................. 370/465, 466, 370/467, 352, 353, 94.1, 60

(56) References Cited

U.S. PATENT DOCUMENTS

| | | | | | |
|---|---|---|---|---|---|
| 4,866,703 | A | * | 9/1989 | Black | 370/60 |
| 5,208,811 | A | * | 5/1993 | Kashio | 370/94.1 |
| 5,351,237 | A | * | 9/1994 | Shinohara | 370/58.3 |
| 5,400,335 | A | * | 3/1995 | Yamada | 370/94.1 |

OTHER PUBLICATIONS

Der PC als multifunktionales Endgerat an ISDN–TK–Anlagen, Greve, pp. 422–427.
8178 Data Communications International 22(1993) Jan., No. 1.
688 NTZ Nachrichten Technsche Zeitschrift 47(1994) Sep., No. 9.

* cited by examiner

Primary Examiner—Dang Ton
Assistant Examiner—Robert W. Wilson
(74) Attorney, Agent, or Firm—Bell, Boyd & Lloyd LLC

(57) ABSTRACT

A communication system for switching data packets, with allocated items of routing information, between connected communication terminal apparatuses and/or communication terminal apparatuses of connected local networks wherein the system includes at least one network coupling unit in which means are arranged for the evaluation of the routing information, for the switching of the data packets dependent on the result of the evaluation, and for the adaptation, in accordance with format, of the data packets. Through the advantageous arrangement of router functions in the network coupling unit, an economical switching-oriented connected can be made between a local network and a public network.

21 Claims, 2 Drawing Sheets

COMMUNICATIONS SYSTEM TO TRANSMITTING DATA PACKETS BETWEEN AFFILIATED COMMUNICATION TERMINALS AND/OR COMMUNICATION TERMINALS OF AFFILIATED LOCAL NETWORKS

BACKGROUND OF THE INVENTION

1. Field of the Invention

The present invention relates, generally, to a communication system for switching data packets between connected communication terminals and, more specifically, to a communication system for switching data packets with allocated items of routing information between communication terminal apparatuses of the communication system and/or communication terminal apparatuses in a local network wherein the communication system includes at least one network coupling unit in the form of a subscriber terminal unit such that time-division-multiplex-oriented terminals which are also arranged in the communication system may be directly connected via the coupling unit.

2. Description of the Prior Art

In known communication systems, connections to a public or private communication network near the communication system are created through primary multiplex terminal units (also called S2 terminals) arranged in the system itself; a communication network taking the form for example, of an ISDN-oriented communication network. Via an S2 connection, a local network --(-- e.g., an Ethernet LAN that connects several personal computers --)-- can be connected with the ISDN-oriented communication network via a router. For this purpose, the router is equipped with both an S2 interface and a LAN interface in accordance with standards, wherein the S2 interface is connected with the output of the S2 terminal unit of the communication system and the LAN interface of the router is connected with the local network.

With respect to its essential function, a router is formed as layer 3 of the OSI reference model, wherein with the aid of router networks is connected physically with the respectively different topology of layers 1 and 2 --(-- e.g., Ethernet LAN and ISDN-oriented communication network. In order to switch data packets between the networks connected to the router, the address indications contained in the routing information of the data packets --(-- destination and source --)-- are interpreted by a control device arranged in the router wherein are evaluated, and the data packets are subsequently converted correspondingly.

The S2 interface has 30 useful channels that can be used only with larger local networks. This means that the S2 interface is not optimally utilized; i.e., the useful channels are physically assigned and cannot be used for other communication terminal apparatuses.

In U.S. Pat. No. 5,208,811, for example, a communication arrangement is described in which a plurality of LAN communication terminal apparatuses, arranged in a local communication network LAN, are connected via a separate network coupling unit (LAN/ISDN interworking unit) to an ISDN-oriented communication network with ISDN communication terminal apparatuses arranged therein. Given a connection setup, initiated by a LAN communication terminal apparatus, to an ISDN communication terminal apparatus, the network coupling unit transmits an ISDN channel number and an item of DLCI (Data Link Connection Identifier) information, representing an ISDN communication path, to the LAN communication terminal apparatus. This apparatus subsequently transmits a LAN data frame, containing an item of communication path information, to the network coupling unit. After reception of the LAN data frame, the network coupling unit carries out a format conversion in which the LAN data frame is converted into an ISDN data frame.

In addition, in U.S. Pat. No. 5,351,237 a communication arrangement is specified in which a multiplicity of local networks, LANs, are connected to an ISDN-oriented communication network via a multiplicity of network coupling units or, respectively, routers. Of the routers arranged in the communication arrangement, one is configured as a higher-order router (main router) and the remaining routers are configured as lower-order routers (sub-routers). Each router has a table in which items of router information are stored. Given an updating request initiated by a sub-router, items of router information updated by the main router are transmitted to the sub-routers in the form of data packets, wherein, using the received items of router information, each sub-router updates the items of router information stored in the tables.

The present invention, therefore, is based on the object of improving the coupling of communication systems, private branch exchanges, and local networks.

SUMMARY OF THE INVENTION

The essential aspect of the inventive communication system for switching data packets with allocated items of routing information between communication terminal apparatuses of the communication system and/or communication terminal apparatuses in a local network is that at least one network coupling unit in the form of a subscriber terminal unit, is arranged in the communication system. The communication system thereby includes a coupling field module that has a plurality of bidirectional terminals that operate according to a time-division-multiplex transmission method, and further includes a control unit that is connected with the coupling field module and has at least one signaling terminal. According to the present invention, the network coupling unit has at least one LAN terminal unit having a LAN interface for connection to a first local network, as well as at least one multiplex unit, which realizes a bidirectional output that operates according to a time-division multiplex transmission method, for connection to at least one of the bidirectional time-division-multiplex-oriented terminals of the coupling field module. In addition, in the network coupling unit there is arranged a signaling unit that includes a signaling output, for connection to the at least one signaling terminal of the control unit, and a conversion unit that is connected with each of the multiplex unit, the signaling unit and the LAN terminal unit. The conversion unit has means for the evaluation of the routing information, and means for switching the data packets from and to the local network or, respectively, from and to the coupling field module, depending on the result of the evaluation. The conversion unit also has means for the conversion, in accordance with a first transmission protocol, of items of signaling information into items of signaling information in accordance with at least one additional transmission protocol, and means for the adaptation of the data format of the data packets that are to be switched in accordance with either the first or the at least one additional transmission protocol.

The essential advantage of the inventive communication system is that through the construction of the network coupling unit as a subscriber terminal unit that can be integrated into the communication system, the time-division-multiplex-oriented terminals, arranged in the communication system, of the coupling field module are connected directly, via the network coupling unit or, respectively, via the conversion unit arranged therein, with the local network connected to the communication system. In this way, data packets that are transmitted to the communication system or, respectively, to the network coupling unit and that include an item of routing information can be switched between the networks connected to the communication system. Through the arrangement of router functions in the network coupling unit, it is possible to do without a financially costly connection of an external router (for example, an ISDN router or access server) including the S2 interface realized in the communication system. It is, thus, also possible to create an economical switching-oriented connection between a local network (for example, Ethernet LAN) and the communication network (for example, a private corporate network or a public ISDN-oriented network). The local network can, for example, be constructed as a communication system-internal administration network having a plurality of administration servers and maintenance servers connected thereto. An external administration central station, arranged in the public communication network, can thus dial into the communication system via the public communication network and can gain access ('dial-in function') to the desired communication system-internal local network or, respectively, to the administration and maintenance servers connected thereto via the inventive network coupling unit. Through the inventive network coupling unit, and the possibility created thereby of remote administration of a communication system, the administration and maintenance of a communication system, in particular of larger switching installations, is simplified considerably.

The network coupling unit advantageously has at least one additional LAN terminal unit connected to the conversion unit, having an additional LAN interface for connection to at least one additional local network. For this purpose, in the conversion unit there are arranged additional means for the switching of the data packets from and to, and between the local networks or, respectively, from and to the coupling field module. In the conversion unit there are also arranged additional means for conversion from and into items of signaling information according to an additional transmission protocol, or items of routing information, and additional means for the adaptation of the data format of the data packets. Through the LAN terminal unit additionally arranged in the network coupling unit, an additional local network (also designated server/customer LAN) can be connected to the network coupling unit and, thus, to the communication system. Through the means arranged in the network coupling unit (router functions), an exchange of data between the two connected local networks is additionally enabled.

Given additional communication systems connected with one another and forming a communication network, the conversion unit has additional means for switching the data packets between communication terminal apparatuses of the communication system and one of the connected local networks, or between the additional communication systems of the communication network and a local network. The conversion unit also has means for the corresponding conversion of the signaling functions, and means for the corresponding adaptation of the data format of the data packets. In this way, a service server which is arranged, for example, in the communication network, can create a connection to a server that is connected with the server/customer LAN of a communication system. This server that is connected with the server/customer LAN can, for example, be constructed as a phone mail server.

According to an embodiment of the inventive communication system, the network coupling unit has means for the unambiguous LAN identification of a LAN interface inside a local network, means for the unambiguous logical network identification of the LAN interfaces and of communication terminal apparatuses of the local networks --(-- the LAN interfaces and the communication terminal apparatuses being allocated to a higher-order network --)-- and means for the communication network identification of the network coupling unit inside the communication network. The unambiguous LAN identification of a LAN interface thereby corresponds to an addressing that has settled in layer I of the OSI reference model, and the logical network identification corresponds to an addressing that has settled in a higher layer (layer 3). Both the unambiguous LAN identification and the logical network identification of a LAN interface are unambiguously valid worldwide; i.e., the LAN interface identified thereby can be addressed under an identification or, respectively, address that is unambiguously valid worldwide. Such is advantageous under the widely distributed Internet protocol or, respectively, Internet address. Through the named means for the identification of the LAN interface or, respectively, of the network coupling unit, the named units or, respectively, interfaces can be addressed using different standardized network access mechanisms or, respectively, network protocols. The network protocols thereby can be arranged on different levels of the OSI reference model, wherein standardized and widely available application software can be used for the exchange of data between the connected networks.

Optionally, the network coupling unit has additional means for the additional local logical network identification of a LAN interface, including the allocated local network. Through this means, a LAN interface already having a global logical network identification can be assigned an additional local logical network identification which, however, is valid only inside the local network connected to the LAN interface. The assignment of local logical network identifiers inside a local network has the advantage that no network identifications or, respectively, Internet protocol addresses that are valid worldwide need be assigned for, e.g., communication terminal apparatuses that are internal to the communication system.

According to an embodiment of the present invention, the unambiguous LAN identification of a LAN interface is in the form of an interface-related standardized LAN address, the logical network identification of a LAN interface is in the form of a standardized Internet address, and the communication network identification of the network coupling unit is in the form of a communication network call number. The interface-related standardized LAN address is for example formed by a hardware address or, respectively, MAC (Medium Access Control) address of a LAN or Ethernet interface. It is six bytes long and is assigned unambiguously worldwide by IEEE. A MAC address is allocated to each LAN interface arranged in the network coupling unit. They are advantageously stored in a PROM during the manufacturing of the assembly and cannot be configured. The standardized Internet protocol address, global or local, is an address of layer 3 of the OSI reference model. In general, this identifies both the LAN interface and the local network connected with the interface. For the case of a provision of a global Internet access through the communication system, the Internet address must be unambiguous worldwide. The Internet address must be unambiguous at least in the networks to which the LAN interfaces arranged in the network coupling unit or, respectively, the bidirectional, time-division-multiplex-oriented outputs have access via the communication network. The Internet addresses can be configured freely.

For the switching of the data packets, means are provided in the network coupling unit for the recognition of the data packet heads. Also, means are provided for the selection of the network identifications arranged in the data packet heads as well as means for the evaluation of the network identifications. In addition, the network coupling unit has means for switching the data packets depending on the result of the evaluation; either to a local network connected to the network coupling unit or to the communication network. Through this advantageous embodiment of routing functions in the network coupling unit, the destination addresses contained in the heads of the data packets are selected, evaluated and subsequently switched to the corresponding destination.

Upon the recognition of data packets to be switched via the communication network, additional means are provided in the network coupling unit for the conversion of the logical network identification into a communication network identification, wherein the communication network identification is formed depending on the logical network identification. In addition, means are provided for the connection setup via the communication network with the communication network identification, and means are provided for the forwarding of the data packets via the set-up connection. This advantageous design enables the setting up of connections to other communication systems arranged in the communication network or, respectively, to the network coupling units arranged therein, the connection is set up via the communication network depending on the logical network identifications contained in the data packets. For this purpose, a corresponding network identification is derived from the logical network identification or, respectively, the logical network identification is converted into the corresponding communication network identification.

For the conversion, memory means are preferably arranged in the network coupling unit for the storing of additional logical network identifications of additional local networks, or, respectively, additional LAN interfaces, arranged in the communication network. In addition, memory means are provided for the allocation of communication network identifications representing an additional network coupling unit, to the stored additional logical network identifications of the additional networks. Through this advantageous design, the logical network identifications selected from the data packet heads are compared with the stored external logical network identifications of the additional external --(-- or, respectively, arranged in the communication network --)-- local networks or, respectively, LAN interfaces and, upon recognition of a stored logical network identification having an allocated communication network identification, the corresponding connection is set up via the communication network on the basis of the communication network identification wherein the data packets are switched to the destination.

Upon the recognition of data packets to be switched to a local network connected to the network coupling unit, means are provided for the recognition of specific network identifications as well as for the conversion of the recognized network identifications into additional local logical network identifications. Also, means are provided for the insertion of the additional local logical network identifications into the data packets as well as for the adaptation and forwarding of the data packets. Through this advantageous design, given data packets that are to be switched to a local network (internal to the communication system) with an allocated local network identification, the logical network identifications are converted into the corresponding local logical network identifications, and the correspondingly adapted data packets are switched within the network internal to the communication system.

Additional features and advantages of the present invention are described in, and will be apparent from, the Detailed Description of the Preferred Embodiments and the Drawing.

DETAILED DESCRIPTION OF THE PREFERRED EMBODIMENTS

Figure 1:
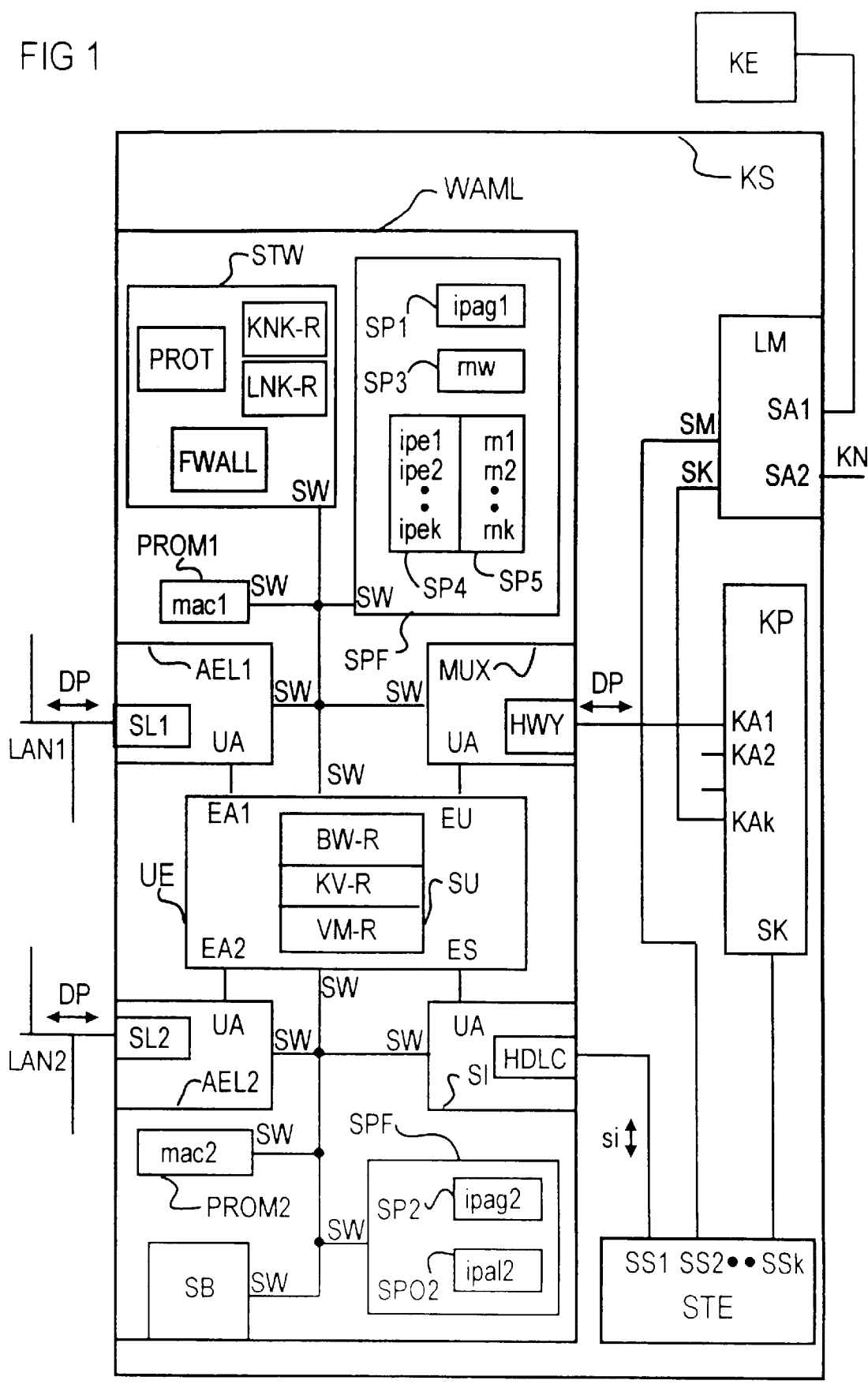
FIG. 1 shows a block switching diagram of the communication system of the present invention having a network coupling unit arranged therein.

FIG. 1 shows, in a block switching diagram, the communication system KS of the present invention having a network coupling unit WAML constructed as a subscriber terminal unit and arranged within the communication system KS. The communication system KS has additional terminal units (one terminal unit LM is shown as an example) for the connection of communication terminal apparatuses to the communication system KS. In addition, a coupling field module KP that has a plurality of bidirectional time-division-multiplex-oriented terminals (KAI . . . k) is arranged in the communication system KS, wherein the time-division-multiplex-oriented outputs (KAI . . . k) are constructed as PCM (pulse code modulation) outputs, also called PCM highways or speech highways. Each PCM highway has 30 useful channels that are constructed as ISDN-oriented B channels having a transmission rate of 64 kbit/s. In addition, a control unit STE that has a plurality of control terminals SS1 . . . k is arranged in the communication system KS. Via a control terminal SSk, the control unit STE is connected with a control input SK of the coupling field module KP. Via the additional control terminals SS 1,2, the control unit STE is connected, on the one hand, with a signaling output HDLC that is arranged in the network coupling unit WAML and is realized by a signaling unit SI and, on the other hand, with terminal units LM. A communication terminal apparatus KE is, for example, connected to a first terminal SA1 of the terminal unit LM, and a public ISDN-oriented communication network KN is, for example, connected to a second bidirectional time-division-multiplex-oriented terminal SA2. Via an additional bidirectional time-division-multiplex-oriented terminal SK, the terminal unit LM is connected to a PCM output KAk of the coupling field module KP.

A multiplex unit MUX having a bidirectional time-division-multiplex-oriented output HWY is likewise arranged in the network coupling unit WAML. The output HWY is likewise constructed as a PCM output or, respectively, PCM highway and is connected with a PCM output KA1 of the coupling field module KP. The network coupling unit WAML has a first LAN terminal unit AEL1 having a first LAN interface SL1 arranged therein, whereby the first LAN interface SL1 is connected with a first local network LAN1. In this exemplary embodiment, the first local network LAN1 is constructed as an Ethernet LAN that is external to the communication system (and is also called a server/customer LAN) in which, for example a phone mail server is arranged. In addition, a second LAN terminal unit AEL2, having a second LAN interface SL2, is arranged in the network coupling unit WAML. The second LAN interface SL2 is connected with a second local network LAN2 that is internal to the communication system. The computers or, respectively, servers provided for the administration and maintenance of the communication system KS are connected to the second communication system-internal network LAN2. All named units AEL1, AEL2, MUX, SI representing a network interface are connected, via a respective terminal UA, with a terminal EA1, EA2, EU, ES of a conversion unit UE arranged in the network coupling unit WAML.

The conversion unit UE has a control unit SU. With the aid of the control unit SU, data packets DP that are transmitted to the subscriber terminal unit WAML or, respectively, to a terminal unit AEL1, AEL2 or multiplex unit MUX or signaling unit SI --(-- also called a port in the following --)-- are switched between the networks LAN1, LAN2 connected with the ports or, respectively, with the B channels, near the network coupling unit WAML, of the public ISDN-oriented communication network KN. For this purpose, suitable means BW-R for the evaluation of the items of routing information contained in the data packets DP (i.e., destination and source data), and means VM-R for the switching of the data packets from and to the local networks LAN1, LAN2 or, respectively, from and to the ISDN-oriented communication network KN, depending on the result of the evaluation, are arranged in the control unit SU of the conversion unit UE. In addition, items of signaling information si are converted in accordance with protocol by the control unit SU. In this way, given data packets DP that are to be switched to a local network LAN1, LAN2, the signaling signals si coming in to the signaling unit SI are converted into corresponding items of routing information, and the useful data coming in to the multiplex unit MUX are converted, together with the formed items of routing information, into data packets that are in accordance with format i.e., are adapted to the Ethernet LAN format and are switched to the corresponding terminal apparatus AEL1, AEL2.

For the exchange of data packets DP between the local networks LAN1, LAN2 connected to the network coupling unit WAML and the communication network KN, an unambiguous identification or address --(-- i.e., one that is valid worldwide --)-- is allocated to each LAN terminal unit AEL1, AEL2 or, respectively, to the LAN interface SL1, SL2 associated therewith. Since the applications that perform the data exchange—for example, a software module that includes a data exchange protocol—have settled at various levels of the OSI reference module, a number of identifications or addresses, valid at different levels of the OSI reference model, are assigned to a LAN terminal unit AEL1, AEL2. In this way, an unambiguous LAN identification mac1, mac2 specific to the assembly is allocated to each LAN terminal unit AEL1, AEL2. The assembly-specific LAN identification mac1, mac2 includes a hardware address of an Ethernet LAN interface SL I, SL2 that has settled at layer 1 of the OSI reference model, and is respectively stored in a non-volatile memory PROM1, PROM2 arranged in the network coupling unit WAML. In addition, an unambiguous or, respectively, global logical network identification ipag1,2 or, respectively, network address is allocated to each LAN terminal unit AEL1, AEL2. This address is 4 bytes long and represents an address of layer 3 of the OSI reference model; for example, an Internet protocol address. The logical network identification ipag1, ipag2 or, respectively, Internet protocol address identifies both the corresponding LAN terminal unit AEL1, AEL2 and the local network LAN 1, LAN2 (or, respectively, sever/customer LAN or communication system-internal local network) connected with the LAN terminal unit AEL1, AEL2. The logical network identification ipag1, ipag2 or, respectively, Internet protocol address identifies both the corresponding LAN terminal unit AEL1, AEL2 and the local network LAN1, LAN2 --(-- connected with the LAN terminal unit AEL1, AEL2 --)-- or, respectively, server/customer LAN or communication system-internal local network. The logical network identification ipag1, ipag2 is respectively stored in a memory region SP1, SP2 of a volatile memory arranged in the network coupling unit WAML. In this exemplary embodiment, for both local networks LAN1, LAN2 connected via a LAN terminal unit AEL1, AEL2 with the network coupling unit WAML, a global Internet access is allowed via the public communication network KN which is likewise connected with the network coupling unit WAML; i.e., the logical network identifications ipag1, ipag2 allocated to the LAN terminal units AEL1, AEL2 are defined in such a way that they are unambiguous worldwide.

In addition, an additional local logical network identification ipal2 is allocated to the second LAN terminal unit AEL2. This identification is stored in an additional memory region SP02 of the volatile memory SPF arranged in the network coupling unit WAML. This local logical network identification ipal2 is valid only inside the second, communication system-internal, local network LAN2. All administration servers and maintenance servers connected with the communication system-internal local network LAN2 likewise include a local logical network identification. Since, in accordance with security-related considerations, the communication system-internal local network LAN2 is decoupled from the public communication network KN or, respectively, the Internet, a network identification that is only locally valid or, respectively, is local and logical, is advantageous within the communication system-internal local network LAN2. All administration and maintenance servers delivered with the communication system can hereby respectively include the same local logical address; that is, the addressing need not represent an Internet protocol address that is unambiguous worldwide. Nonetheless, order to enable the communication system performance feature "remote maintenance," the communication system-internal local network LAN I must be addressable via the network coupling unit WAML or, respectively, via the LAN terminal unit AEL2 arranged there in the communication network KN. The addressing takes place with the logical network identification ipag2 stored in the memory region SP2 and allocated to the second LAN terminal unit AEL2. In order to enable access, via the public communication network KN, to the servers arranged in the communication system-internal local network LAN2 as well as to the public communication network KN from the communication system-internal local network LAN2, the items of routing information containing a destination and source identification are converted in a manner corresponding to the data packets DP transmitted to the network coupling unit WAML using the means arranged in the control unit SU of the conversion unit UE.

For this purpose, the heads of the data packets DP are recognized by an evaluation routine BW-R arranged in the control unit SU. From the items of routing information contained in the data packet heads, the logical network identifications ipag1,2, ipal2 which respectively represent a destination and a source, are selected and evaluated. Upon recognition of a logical network identification ipag2 addressing the communication system-internal local network LAN2 as a destination, a conversion routine KV-R arranged in the control unit SU converts the logical network identification ipag2 into the local logical network identification ipal2 allocated to the second LAN terminal unit AEL2. Likewise, given data packets DP transmitted to the second LAN terminal unit AEL2 by the communication system-internal local network LAN2, i.e. given recognition of a local logical network identification ipal2 addressing the communication system-internal local network LAN2 as its source, this identification is converted into the corresponding logical network identification ipag2 by the conversion routine KV-R. After the conversion of the logical network identification ipag2, ipal2, the redundant items of error correction information which are also contained in the data packets DP are recalculated by the conversion routine KV-R and are correspondingly inserted into the data packets DP. The data packets DP converted and adapted in this way are subsequently switched further, according to the current routing information, by a switching routine VM-R arranged in the control unit SU.

In the network coupling unit WAML there is arranged a control unit STW that includes a protocol unit PROT and a filter unit FWALL. The control unit STW is connected, via control inputs SW, with the units AEL1, 2, MUX, UE, arranged in the network coupling unit WAML, and with the memories SPF, PROM 1,2. The protocol unit PROT is responsible for, and protects the switching or, respectively, the transporting of the data packets DP that are to be exchanged between the networks LAN 1, LAN2, KN. In the protocol unit PROT, both the Internet-specific protocols TCP/IP (Transmission Control Protocol/Internet Protocol) and the PPP protocol (Point-to-Point Protocol) designed for the transport of TCP/IP data packets via a point-to-point connection are contained.

The filter unit FWALL effects a security-related decoupling of the networks LAN I, LAN2, KN connected to the network coupling unit WAML. Through the filtering function in the filtering unit FWALL, both a data access from the first local network LAN 1 (server/customer LAN) to the second communication system-internal local network LAN2 and a data access, via the ISDN-oriented communication network KN, to the two local networks LAN 1, LAN2 are checked for authorization and are controlled. For other filter functions, both the source and the destination addresses, contained in the items of routing information of the data packets DP that are to be switched, are checked for permissibility --;-- also known as source and destination checking. During the checking of the source address, given a connection setup introduced via the public communication network KN, the call number of the calling communication terminal apparatus (subscriber authentication) is checked on the basis of a list having predefined authorized call numbers (not shown), wherein unauthorized connections via the public communication network KN are thus prevented. In addition, the logical network identification and/or the Ethernet LAN address of data packets DP coming in to a LAN terminal unit AEL1, AEL2 are checked. If the source address for the exchange of data via the network coupling unit WAML is authorized, the destination address contained in the routing information is checked according to the named criteria.

After a successful passage of the data packets DP through the filter functions, or after confirmation of the authorization of the exchange of data between the source addresses and destination addresses indicated in the items of routing information, the routing functions residing in the network coupling unit WAML or, respectively, in the conversion unit UE and protocol unit PROT evaluate and, if warranted, convert the destination addresses or, respectively, logical network identifications ipag 1,2, ipal2 contained in the data packets DP. If a local network LAN I, LAN2 connected to the network coupling unit WAML is determined by a logical network identification, the data packets DP are correspondingly switched via the conversion unit UE in the manner cited.

In addition, logical destination network identifications ipe1 . . . k of all additional communication systems arranged in the communication network, or, respectively, of the local networks (not shown) connected there and that are provided for an exchange of data with a communication terminal apparatus (not shown) connected to one of the two local networks LAN I, LAN2, are stored in a fourth memory region SP4 arranged in the network coupling unit WAML of the volatile memory SPF. For this purpose, a communication network identification m1 . . . k, respectively representing an ISDN-oriented call number, of corresponding network coupling units (not shown) arranged in the additional communication system are stored in a fifth memory region SP5, allocated to the fourth memory region SP4, of the volatile memory SPF. At least one ISDN-oriented call number m1 . . . k is allocated to each logical destination identification ipe1 . . . k stored in the fourth memory region SP4. Given data packets DP that identify a communication system arranged in the public communication network KN as the destination, the router functions in the network coupling unit WAML determine the corresponding logical network identification ipe1 . . . k, stored in the fourth memory region SP4, and, on the basis of the allocated call number m1 . . . k stored in the fifth memory region SP5, a corresponding B-channel connection is set up via the public ISDN-oriented communication network KN.

So that additional communication systems arranged in the communication network KN can set up a corresponding B-channel connection to the communication system KS or, respectively, to the network coupling unit WAML for the transmission of data packets DP, an unambiguous communication network identification mw is allocated to the network coupling unit WAML. This network identification rnw is stored in a third memory region SP3 of the volatile memory SPF.

In addition, in the network coupling unit WAML, an interface unit SB that includes at least one serial and/or parallel interface is provided. A personal computer (not shown) can be connected to the network coupling unit WAML via the interface unit SB, for example using a V.24 connection. With the aid of the personal computer, for example, the program-specific states that are executed in the units UE, STE, SPF arranged in the network coupling unit WAML can be monitored --;-- for example, trace and debugging.

Figure 2:
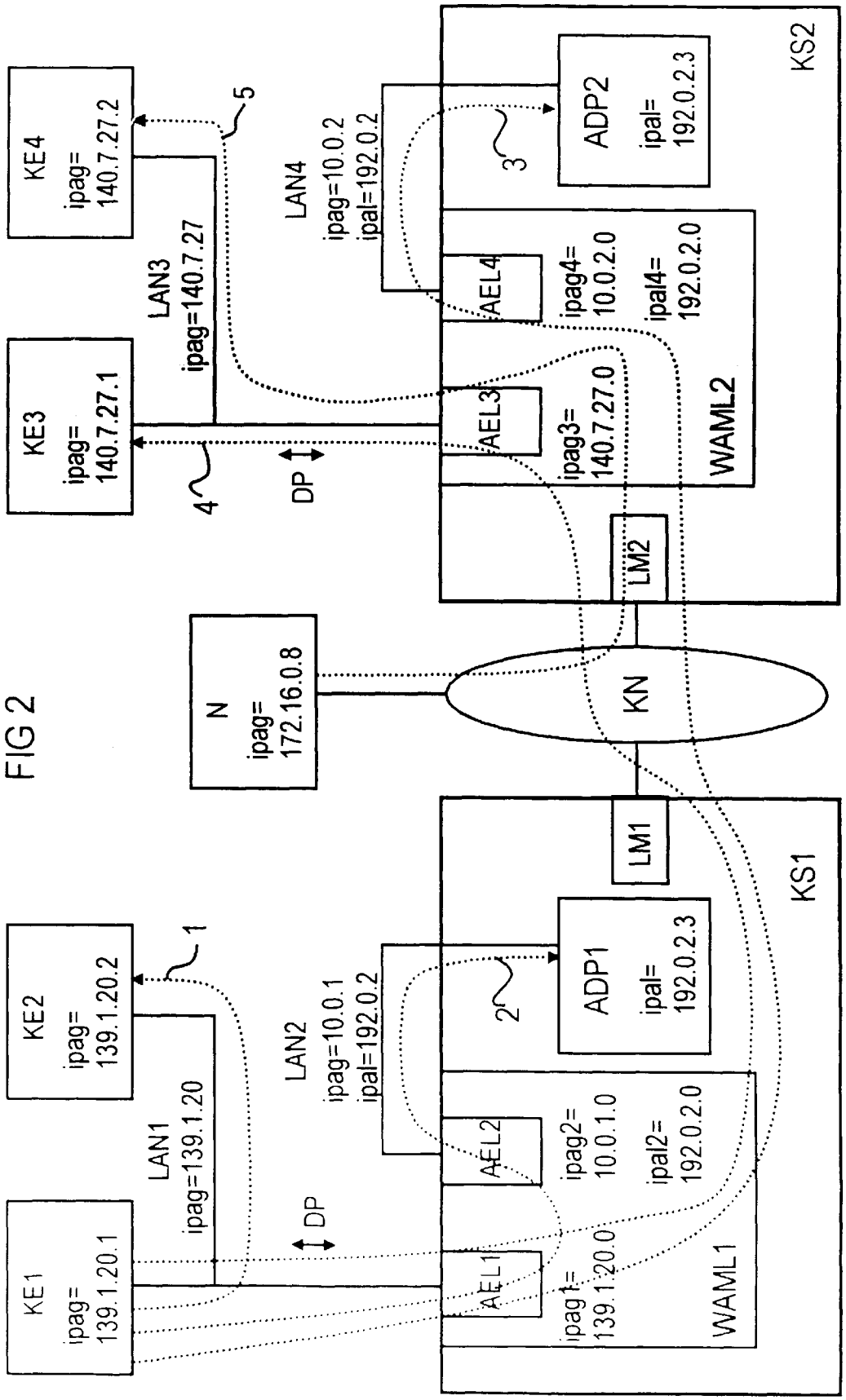
FIG. 2 shows a block switching diagram of an arrangement of two communication systems according to FIG. 1, arranged in a communication network.

The exchange of data packets DP between local networks LAN1 . . . 4 connected to a network coupling unit WAML1,2 or, respectively, to a public communication network KN, and in particular the conversion in accordance with protocol, and conversion in accordance with format of the data packets DP that are to be switched, is explained in more detail on the basis of the block switching diagram shown in FIG. 2. The block switching diagram shows a schematic representation of two communication systems KS1, KS2 that are designed according to FIG. 1 and are arranged in a public, ISDN-oriented communication network KN. Each communication system KS1, KS2 or, respectively, the coupling field module arranged therein, is connected to the communication network KN via a terminal unit LM1,2. A network coupling unit WAML1,2 according to FIG. 1 is arranged in each communication system KS1,2. The network coupling unit WAML1 arranged in the first communication system KS1 includes two LAN terminal units AEL1, AEL2, each realizing a LAN interface. A logical network identification four bytes in length, ipag1= 139.1.20.0, is allocated to the first LAN terminal unit AEL 1. In the following, only logical network identifications ipag, ipal or, respectively, the Internet protocol addresses allocated to the individual units or local networks, are considered; that is, the transport realized layers 3 and 4 of the OSI reference model or, respectively, the exchange, controlled by the TCP/IP transport protocols arranged therein, of data packets DP is explained in more detail.

As explained in FIG. 1, a first local network LAN I is connected to the first LAN terminal unit AEL1 via which two network communication terminal apparatuses KE1, KE2 are connected with the network coupling unit WAML 1 or, respectively, with the communication system KS1. In the exemplary embodiment, the standardized Internet protocol addresses are structured according to version 4; that is, they include four bytes. Local networks hereby can be identified unambiguously through the items of addressing information, including the first three bytes, and through the addressing information including the last byte the communication terminal apparatuses can be identified in the respective local network—called a Class C network in the standard. Through the allocation of the Internet protocol address ipag1=139.1.20.0 to the first LAN interface AEL1, both the first LAN interface AEL1 and also the local network LAN 1 connected therewith are identified by the first three bytes ipag=139.1.20. The two communication terminal apparatuses KE1, KE2 arranged in the local network LAN I correspondingly have the Internet protocol addresses ipag= 139.1.20.1 and ipag=139.1.20.2. A communication system-internal local network LAN2 is connected to the second LAN interface AEL2 arranged in the network coupling unit WAML1. An administration unit ADP1, which is arranged in the communication system KS1, is connected, via the communication system-internal local network LAN2, with the network coupling unit WAML1. The administration unit ADP1 is used for the administration and maintenance of the communication system KS1. Additional central communication system-specific units, such as "phone mail" or "fee charging unit," can be connected (not shown) to the communication system-internal local network LAN2. In order to ensure the greatest possible protection of data stored in the administration unit ADP 1, or of functions performed there, the communication system-internal network LAN2 is decoupled from the other networks LAN1, KN connected to the network coupling unit WAML1. An Internet protocol address ipal=192.0.2.3, valid only inside the communication system-internal local network LAN2, is allocated to the administration unit ADP1. This local Internet protocol address ipal is the same in all communication systems of the same type KS1, KS2 for the respective administration units ADP1, ADP2, wherein advantageously, the applications performed in the communication systems KS1, KS2 --(-- for example, the same software modules --)-- do not have to be adapted to different Internet protocol addresses. The second LAN interface AEL2, arranged in the first network coupling unit WAML1, is assigned both an Internet protocol address ipag2=10.0.1.0 and a local Internet protocol address ipal2= 192.0.2.0. Through the allocation of the two Internet addresses ipag2, ipal2, the LAN interface AEL2 is identified unambiguously both in the first local network or, respectively, communication network LAN1, KN and in the communication system-internal network LAN2, and thus can be addressed from each of the cited networks LAN2, LAN2, KN as a destination.

The second communication system KS2 shown in FIG. 2, with the network coupling unit WAML2 arranged therein and with the local networks LAN3, LAN4 or, respectively, the public communication network KN connected thereto, has the same structural design as the specified first communication system KS1. The third LAN interface AEL3, which is arranged in the network coupling unit WAML2, is assigned the Internet protocol address ipag3=140.7.27.0, and the local network LAN3, connected with the third LAN interface AEL3, is assigned the Internet protocol address ipag=140.7.27. The communication terminal apparatuses KE3, KE4 arranged in the third local network LAN3, correspondingly include the Internet protocol addresses ipag=140.7.27.1 and ipag=140.7.27.2. In addition, the fourth LAN interface AEL4, arranged in the network coupling unit WAML2, is assigned, on the one hand, the Internet protocol address ipag4=10.0.2.0 and, on the other hand, the local Internet protocol address ipal4=192.0.2.0. In the exemplary embodiment, as explained in the first communication system KS1, the administration unit ADP2 arranged in the communication system-internal local network LAN4 is assigned the same local Internet protocol address ipal=192.0.2.3.

In addition, in FIG. 2 an external communication terminal apparatus N, connected directly to the communication network KN, is shown that has the Internet protocol address 172.16.0.8.

In the following, as an example, the use in accordance with protocol of data packets DP that are to be exchanged between the local networks LAN1 . . . LAN4, which are connected with the communication systems KS1, KS2, and the conversion of the items of routing information of these data packets DP, is explained in more detail:

Given data packets DP that are to be exchanged within a local network LAN1 . . . LAN4, the data packets DP are switched directly without the participation of the corresponding network coupling unit WAML1, WAML2 --;-- indicated as an example by a first dotted line 1. Thus, for example, data packets DP that are to be switched from the first communication terminal apparatus KE1 to the second communication terminal apparatus KE2 inside the local network LAN1 include the Internet protocol address ipag1= 139.1.20.1 as source address, and the Internet protocol address ipag2=139.1.20.2 as destination address, in the items of routing information.

Given data packets DP that are to be switched from the first communication terminal apparatus KE1 to the administration unit ADP1 of the first communication system KS1 (indicated by a second dotted line 2), these data packets have the global Internet protocol address ipag=193.1.20.1 as source address and the global Internet protocol address ipag=10.0.1.3 as destination address. Through the routing and conversion means arranged in the network coupling unit WAML1, the Internet protocol address ipag=10.0.1.3, representing the communication system-internal local network LAN2, is converted into the corresponding local Internet protocol address ipal=192.0.2.3, wherein the items of error correction information which enable an error correction and are likewise contained in the data packets DP are recalculated and correspondingly inserted into the data packet DP.

Through the conversion of the Internet protocol address into the local Internet protocol address, the data packets DP can be switched inside the decoupled communication system-internal local network LAN2 and transmitted to the administration unit ADP 1 that is identified by the destination addressing.

Data packets DP that are to be switched from the first communication terminal apparatus KE1, connected with the first communication system KS1, to the second administration unit ADP2, arranged in the second communication system KS2 (indicated by a third dotted line 3), include the Internet protocol address ipag=139.1.20.1 as source address and the Internet protocol address ipag=10.0.2.3 as destination address. From this, the corresponding call number m1 ... k of the network coupling unit WAML2, arranged in the second communication system KS2, is subsequently derived in the first network coupling unit WAML1 with the aid of the evaluation routine BW-R. Through the switching routines VM-R in the first network coupling unit WAML-1, a corresponding ISDN-oriented connection or, respectively, B-channel connection is set up to the second network coupling unit WAML2 which is arranged in the second communication system KS2 and addressed on the basis of the call number, wherein the data packets DP are transmitted from the first network coupling unit WAML1 to the second network coupling unit WAML2 via the communication network KN. Through the conversion routines KV-R arranged in the second network coupling unit WAML2, the global Internet protocol address ipag4=10.0.2.3, representing a communication system-internal local network LAN4, is converted into the corresponding local Internet protocol address ipal=192.0.2.3, and an item of error correction information is calculated.

Given data packets DP that are to be switched from the first communication terminal apparatus KE1 to the third communication terminal apparatus KE3, which is connected with the second communication system KS2 (indicated by a fourth dotted line 4), these data packets include the Internet protocol address ipag=193.1.20.1 as source address and the Internet protocol address ipag=140.7.27.1 as destination address. The corresponding call number of the network coupling unit WAML2, arranged in the second communication system KS2, is subsequently derived from the destination addressing with the aid of the evaluation and switching routines KNK-R, VM-R which are arranged in the first network coupling unit WAML1. A corresponding ISDN-oriented B-channel connected to the network coupling unit WAML2, addressed on the basis of the call number, is then set up and the data packets DP are subsequently transmitted from the first network coupling unit WAML1 to the second network coupling unit WAML2. Through the evaluation and switching routines BW-R, VM-R, arranged in the second network coupling unit WAML2, the transmitted data packets DP are switched to the third local network LAN3 or, respectively, to the third communication terminal apparatus KE3 according to the destination addressing ipag=140.7.27.1.

Given data packets DP that are to be switched from the external communication terminal apparatus N, connected directly to the communication network KN, to the fourth communication terminal apparatus KE4, connected with the second communication system KS2 (indicated by a fifth dotted line 5), first a corresponding ISDN-oriented B-channel connection is set up between the external communication terminal apparatus N and the network coupling unit WAML2 arranged in the second communication system KS2. Subsequently, the data packets DP are transmitted from the external communication terminal apparatus N to the network coupling unit WAML2. The data packets DP include the Internet protocol address ipag=172.16.0.8 as source addressing and the Internet protocol address ipag=140.7.27.2 as destination addressing. Through the evaluation and switching routines BW-R, VM-R arranged in the second network coupling unit, the transmitted data packets DP are switched to the third local network LAN3 or, respectively, to the fourth communication terminal apparatus KE4 according to the destination addressing ipag=140.7.27.2.

Although the present invention has been described with reference to specific embodiments, those of skill in the art will recognize that changes may be made thereto without departing from the spirit and scope of the invention as set forth in the hereafter appended claims.

What is claimed is:

1. A communication system for switching data packets, which have allocated items of routing information, between communication terminal apparatuses connected with the communication system, the communication system comprising:

a coupling field module having a plurality of bidirectional terminals that operate according to a time-division multiplex transmission method;

a control unit connected to the coupling field module, the control unit having at least one signaling terminal;

at least one network coupling unit formed as a subscriber terminal unit;

at least one LAN terminal unit in the network coupling unit, the LAN terminal unit having an LAN interface for connection to a first local network;

at least one multiplex unit in the network coupling unit, the multiplex unit having a bidirectional output that operates according to a time-division multiplex transmission method, the multiplex unit connected to at least one of the bidirectional terminals of the coupling field module;

a signaling unit having a signaling output, the signaling unit connected to the at least one signaling terminal of the control unit; and a conversion unit connected to each of the multiplex unit, the signaling unit and the LAN terminal unit, the conversion unit having means for evaluating the routing information, means for switching the data packets from and to one of the local network and the coupling field module depending on a result of the evaluation, means for converting, according to a first transmission protocol, items of signaling information into items of signaling information according to at least one additional transmission protocol, and means for adaptation, according to the first or the at least one additional transmission protocol, of the data format of the data packets that are to be switched.

2. A communication system as claimed in claim 1, further comprising:

at least one additional LAN terminal unit in the network coupling unit connected to the conversion unit, the additional LAN terminal unit having an additional LAN interface for connection to at least one additional local network of an additional type, and wherein the conversion unit further has additional means for switching the data packets from and to and between at least one of the local networks and the coupling field module, additional means for converting from and into items of signaling information according to an additional transmission protocol, and additional means for adaptation of a data format of the data packets.

3. A communication system as claimed in claim 2, wherein, given additional communication systems connected among one another to form a communication network, and given external communication terminal apparatuses connected with the communication network, the conversion unit further has additional means for switching the data packets between one of the connected local networks and at least one of the communication terminal apparatuses of the communication system, the additional communication systems of the communication network and the external communication terminal apparatuses connected with the communication network, means for the corresponding conversion of the items of signaling information, and means for the corresponding adaptation of the data format of the data packets.

4. A communication system as claimed in claim 2, wherein the network coupling unit further comprises:
   means for unambiguous LAN identification of an LAN interface within a local network;
   means for unambiguous logical network identification of the LAN interfaces and of communication terminal apparatuses of the local networks, wherein the LAN interfaces and the communication terminal apparatuses are allocated to a higher-order network; and
   means for communication network identification of the network coupling unit within the communication network.

5. A communication system as claimed in claim 4, wherein the network coupling unit further comprises:
   means for additional local logical network identification of an LAN interface, including the allocated local network.

6. A communication system as claimed in claim 4, wherein the unambiguous LAN identification of one of the LAN interfaces is stored in a non-volatile memory arranged in the network coupling unit, the logical network identification of one of the LAN interfaces is respectively stored in a memory region of a volatile memory arranged in the network coupling unit, the additional local logical network identification of one of the LAN interfaces is respectively stored in a memory region of the volatile memory, and the communication network identification of the network coupling unit is stored in a memory region of the volatile memory.

7. A communication system as claimed in claim 4, wherein the unambiguous LAN identification of one of the LAN interfaces is formed by an interface-related, standardized LAN address, a logical network identification of one of the LAN interfaces is formed by a standardized internet address, and the communication network identification of the network coupling unit is formed by a communication network call number.

8. A communication system as claimed in claim 7, wherein, for the switching of data packets, the network coupling unit further comprises:
   means for recognizing the data packet heads;
   means for selecting the network identification arranged in the data packet heads;
   means for evaluating the network identification; and
   means for switching the data packets, depending on the result of the evaluation, to one of the local networks connected to the network coupling unit and the communication network.

9. A communication system as claimed in claim 8, wherein, for the switching of data packets via the communication network, the communication system further comprises:

additional means for the conversion of the logical network identification into a communication network identification wherein the communication network identification is formed depending on the logical network identification;

additional means for the connection set up, via the communication network, with the communication network identification; and additional means for the forwarding of the data packets via the set-up connection.

10. A communication system as claimed in claim 9, wherein, for the conversion of the logical network identification, the network coupling unit further comprises:
   memory means for storage of additional logical network identifications of at least one of additional local network arranged in the communication network and additional LAN interfaces; and
   memory means for allocation of a communication network identification, representing a respective additional network coupling unit, to the stored additional logical network identifications of the additional local networks.

11. A communication system as claimed in claim 8, wherein, for the switching of data packets to at least one of an additional local network connected to the network coupling unit and an LAN interface, the communication system further comprises:
   additional means for the recognition of specific network identifications;
   additional means for the conversion of the recognized network identifications into additional local logical network identifications;
   additional means for the insertion of the additional local logical network identifications into the data packets; and
   additional means for the adaptation and forwarding of the data packets.

12. A communication system as claimed in claim 11, wherein, for the switching of data packets transmitted from the local network to one of the network coupling unit and an LAN interface, the communication system further comprises:
   means for the recognition of local network identifications;
   means for the conversion of the recognized local network identifications into logical network identifications; and
   means for the insertion of the logical network identifications into the data packets.

13. A communication system as claimed in claim 1, further comprising:
   security means in the network coupling unit for checking items of routing information transmitted to the network coupling unit with regard to the permissibility of communication relations between source and destination identification determined by the routing information.

14. A communication system as claimed in claim 3, wherein the communication network is an ISDN-oriented communication network.

15. A communication system as claimed in claim 2, wherein at least one of the local networks is one of a ring network, a bus network and a star network.

16. A communication system as claimed in claim 2, wherein at least one of the LAN interfaces is constructed according to one of the specification IEEE 802.3, 802.4 and 802.5.

17. A communication system as claimed in claim 1, wherein the at least one bidirectional output is an ISDN-oriented multiplex interface that is intended to the communication system and includes a plurality of useful channels.

18. A communication system as claimed in claim 14, wherein the network coupling unit further comprises:
- means for the determination of a current number of data packets to be transmitted to a destination within a predetermined time interval;
- means for the determination of a current number of ISDN connections from the currently determined number of data packets to be transmitted; and
- means for the dynamic setting up and tearing down of the currently determined number of ISDN connections to a destination.

19. A communication system as claimed in claim 1, further comprising:
- means for secured switching and transmission of data packets in the network coupling unit operating according to at least one transmission protocol.

20. A communication system as claimed in claim 19, wherein the means for the secured switching and transmission of data packets is constructed such that the switching and transport of the data packets takes place on the basis of the transport protocol TCP/IP, and the transport of the data packets via the ISDN-oriented useful channels is secured by means of the PPP protocol.

21. A communication system as claimed in claim 1, further comprising:
- a terminal apparatus terminal unit in the network coupling unit having at least one of a serial number and a parallel interface for the connection of a user terminal apparatus.

* * * * *